(12) United States Patent
Masse

(10) Patent No.: US 9,551,218 B2
(45) Date of Patent: Jan. 24, 2017

(54) OPTIMIZED MINE VENTILATION SYSTEM

(75) Inventor: Michel Masse, Brossard (CA)

(73) Assignee: HOWDEN ALPHAIR VENTILATING SYSTEMS INC., Toronto (CA)

( * ) Notice: Subject to any disclaimer, the term of this patent is extended or adjusted under 35 U.S.C. 154(b) by 1691 days.

(21) Appl. No.: 12/530,808

(22) PCT Filed: Sep. 1, 2008

(86) PCT No.: PCT/IB2008/002260
§ 371 (c)(1),
(2), (4) Date: Sep. 11, 2009

(87) PCT Pub. No.: WO2009/027815
PCT Pub. Date: Mar. 5, 2009

(65) Prior Publication Data
US 2010/0105308 A1    Apr. 29, 2010

(30) Foreign Application Priority Data

Aug. 31, 2007    (CA) ...................................... 2599471

(51) Int. Cl.
*E21F 1/00*    (2006.01)
*E21F 3/00*    (2006.01)
(Continued)

(52) U.S. Cl.
CPC ................. *E21F 1/00* (2013.01); *G05B 15/02* (2013.01); *G05B 17/02* (2013.01); *Y02B 60/50* (2013.01); *Y02P 80/10* (2015.11)

(58) Field of Classification Search
CPC .................................. E21F 1/00; G05B 15/02
USPC .... 454/168, 169, 170, 171, 172; 299/12, 1.4
See application file for complete search history.

(56) References Cited

U.S. PATENT DOCUMENTS 5,269,660 A * 12/1993 Pradelle .................... E21F 1/00
                                                              417/18
5,464,369 A    11/1995 Federspiel
(Continued)

FOREIGN PATENT DOCUMENTS

CA        2645443 A1    9/2007
JP        53059251       5/1978
(Continued)

OTHER PUBLICATIONS

Kocsis. C.K., "The integration of mine simulation and ventilation simulation to develop a "Life-Cycle" mine ventilation system", South African Institute of Mining and Metallurgy, 2003.
(Continued)

*Primary Examiner* — Steven B McAllister
*Assistant Examiner* — Jonathan Cotov

(57) ABSTRACT

The optimized mine ventilation system of this invention supplements mine ventilation basic control systems composed of PLCs (Programmable Logic Controllers with human machine interfaces from vendors such as Allen-Bradley™, Modicon™ and others) or DCSs (Distributed Control System from vendors such as ABB™ and others) with supervisory control establishing a dynamic ventilation demand as a function of real-time tracking of machinery and/or personnel location and where this demand is optimally distributed in the work zones via the mine ventilation network and where the energy required to ventilate is minimized while totally satisfying the demand for each work zones. The optimized mine ventilation system operates on the basis of a predictive dynamic simulation model of the mine ventilation network along with emulated control equipment such as fans and air flow regulators. The model always reaches an air mass flow balance where the pressure and density is preferably compensated for depth and accounts for the natural ventilation pressure flows due to temperature
(Continued)

differences. Model setpoints are checked for safety bounds and sent to real physical control equipment via the basic control system.

44 Claims, 3 Drawing Sheets

(51) Int. Cl.
 G05B 15/02 (2006.01)
 G05B 17/02 (2006.01)

(56) References Cited

U.S. PATENT DOCUMENTS

| | | | |
|---|---|---|---|
| 5,803,804 | A | 9/1998 | Meier et al. |
| 6,512,312 | B1 * | 1/2003 | Herkenrath ............. E21D 23/12 |
| | | | 307/326 |
| 6,645,066 | B2 | 11/2003 | Gutta et al. |
| 6,735,556 | B2 | 5/2004 | Copel |
| 6,916,239 | B2 * | 7/2005 | Siddaramanna .......... F24F 7/00 |
| | | | 236/49.1 |
| 7,123,149 | B2 | 10/2006 | Nowak et al. |
| 7,866,312 | B2 * | 1/2011 | Erdmann .................. 126/299 D |

FOREIGN PATENT DOCUMENTS

| | | |
|---|---|---|
| JP | 5214900 | 8/1993 |
| JP | 2007092517 | 4/2007 |
| SU | 1681023 A1 | 9/1991 |
| WO | WO 00/36275 A1 | 6/2000 |
| WO | WO 2007/107029 A1 | 9/2007 |

OTHER PUBLICATIONS

Chen Bing Ching, "Automated Control of the Mine Ventilation System at Hsikwangshan" Proceedings of the 3rd Mine Ventilation Symposium, Oct. 12-14, 1987, cover and pp. 226-230.

Hardcastle, S. et al, "Intergrated Mine Ventilation Management Systems" Proceedings of the 6th International Mine Ventilation Congress, Pittsburgh, PA, May 17-22, 1997, cover and pp. 19-24.

A.D.S. Gillies, et al., "Development of a Real-Time Airflow Monitoring and Control System" Mine Ventilation, Ganguli & Bandopadhyay, 2004, Taylor & Francis Group, London, pp. 145-155.

F. H. Von Glehn et al, "Verification and Calibration of Ventilation Network Models" 12th U.S. North American Mine Ventilation Symposium 2008—Wallace, p. 275 to 279.

C.K. Kocsis et al., "Ventilation system operating cost comprison between a conventional and an automated underground metal mine", 8 pages, 2003, H.W. Wilson Company.

Widzyk-Capehart, E. et al., "Life of Mine Ventilation Requirements for Bronzewing Mine Using Ventsim", 7th International Mine Ventilation. Congress, Krakow, Poland, 2001, pp. 815-822.

Hardy, R.J. et al, "Ventilation simulation programs MineVent and MFIRE: Updates to adavance the technology of simulation programming" 6 pages, 2006, Mutmansky & Ramani,Taylor & Francis Group, London.

Marx, W. et al, "Design of energy efficient mine ventilation and cooling systems", 6 pages, 2006, Mutmansky & Ramani, Taylor & Francis Group, London.

Hardcastle, S. G. et al, "Quantity or Quality—A pilot trial at Barrick Gold's Bousquet Mine" University of Missouri, Missouri, Jun. 1999, pp. 31-38.

Hardcastle, S & Kocsis C., "Justifying ventilation-on-demand in a Canadian Mine and the Need for Process Based Simulations", 11th North American Mine Ventilation Symposium, 2006, Taylor & Francis Group, London.

First Notice of reexamination issued by Canadian Patent Office on Sep. 21, 2010.

Second Notice of reexamination issued by Canadian Patent Office on Sep. 21, 2010.

Written Opinion for PCT/IB2008/002260.

International Search Report for PCT/IB2008/002260.

* cited by examiner

OPTIMIZED MINE VENTILATION SYSTEM

CROSS-REFERENCE TO RELATED APPLICATIONS

The present patent application claims the benefits of priority of Canadian Patent Application No. 2,559,471, filed on Aug. 31, 2007, at the Canadian Intellectual Property Office and entitled: "Underground communication network system for personnel tracking and HVAC control".

FIELD OF THE INVENTION

The present invention generally relates to mining underground ventilation control and its optimization as a function of a dynamic demand related to the tracking of the machinery location and/or operating status and/or personnel location. More specifically it relates to the predictive modeling and simulation along with the optimization of the air distribution and fans energy consumption to physically control the operating setpoints for fans and air flow regulators.

BACKGROUND OF THE INVENTION

FIG. 1 represents a typical mine ventilation layout with airflow control equipment. The intent is not to generalize the FIG. 1 layout example to all mines, but to typically explain and associate the optimized mine ventilation system application to mining ventilation. The optimized mine ventilation system can be applied to an infinite variation of mine layout configurations.

As shown on FIG. 1 a mine is typically composed of the following elements:

One or more intake fans [FIG. 1, element (2)] provide air from the surface atmosphere to the underground infrastructure via one or more downcast shafts [FIG. 1, element (3)]. The fans speed is manually controlled by a local controller or by a basic control system with surface HMI (Human Machine Interface). The control system usually also includes startup and shutdown sequences and protection interlocks.

The downcast shaft(s) provides fresh air to working levels where production occurs on one or more extraction zones off each level [FIG. 1, elements (5, 6, 7)]. Ramps with or without access doors will also divert some air from each levels to other levels [FIG. 1, elements (8, 9)]. Ramps provide a route for equipment to move from one level to another.

Ore and waste material is extracted from the production zones by diesel machinery and is dropped in ore or waste passes down to lower levels to be crushed and brought back to the surface by conveyors in shafts [FIG. 1, elements (26, 27)].

Air is forced from each level to the ore extraction zones or service areas [FIG. 1, elements (10, 11, 29, 12, 13, 14)] by auxiliary fans and ducting connected to the fans [FIG. 1, elements (15, 16, 30, 17, 18, 19)]. As per the surface fans, the auxiliary fans speed is manually controlled by a local controller or by a basic control system with surface HMI (Human Machine Interface). The diesel particulate emission contaminated air from the ore extraction zones comes back to the level via the ore extraction excavation.

Contaminated air is flowing to upcast shaft(s) [FIG. 1, element (4)] through fixed opening bulkheads or bulkheads with variable air flow regulators [FIG. 1, elements (23, 24, 25)]. The air flow regulators position is manually controlled by a local controller or by a basic control system with surface HMI (Human Machine Interface).

In some modern installations air flow measurement stations are found at the bulkhead [FIG. 1, elements (20, 21, 22)].

Sometimes when the surface fans capacity is exceeded, lower levels will have additional booster fans used as in-line pressure enhancers [FIG. 1, element (28)]. The fans speed is manually controlled by a local controller or by a basic control system with surface HMI (Human Machine Interface). The control system usually also includes startup and shutdown sequences and protection interlocks.

One or more exhaust fans [FIG. 1, element (1)] draw air from one or more upcast shafts [FIG. 1, element (4)] out to the surface atmosphere. The fans speed is manually controlled by a local controller or by a basic control system with surface HMI (Human Machine Interface). The control system usually also includes startup and shutdown sequences and protection interlocks.

Traditionally the calculation of required setpoints for fans speed and bulkheads surface area opening or air flow regulator opening position has been achieved by manual survey results of air flows and regulatory requirements for maximum diesel equipment presence in one work zone. In addition, numerous mine operators use the calculation assistance of commercially available ventilation network steady state non real-time simulators designed to simulate existing ventilation networks. Fan operating points, airflow quantities, and frictional pressure drops are obtained from those calculations to assist derive physical operating setpoints.

There are several drawbacks and deficiencies in those fans speed and bulkhead opening setpoint calculations:

Surveys are spontaneous measurements and are not representative of the changing operating environment of a live mine. Therefore, maximum safe setpoint values have to be used to be representative of the worst case scenarios.

Commercially available simulators lack one or more of the following capabilities rendering them unfit for live real-time control. They are either non real-time calculation engines unfit for live control. Their pressure and flow calculations may also omit the depth air column compensation for air density and pressure calculation which creates significant errors in the results also rendering them unfit for live real-time control. Their flow calculations may not be compensated for natural ventilation pressure flows from temperature differences. This also renders them unfit for live real-time control.

The aforementioned control equipment setpoint calculation methods are therefore used with limits and safety factors that cannot dynamically adjust to accommodate a live diesel machinery ventilation presence often wasting valuable air therefore not available to other work zones. Hence, those setpoint calculations do not offer a live dynamic optimization of the air flow routing and distribution. In conclusion, those production ventilation setpoint calculation methods often prohibits mine operators to access deep remote ore body sectors due to the lack of available air.

The optimized mine ventilation system has been engineered to circumvent those previously mentioned setpoint calculation deficiencies. The optimized mine ventilation system permits on-demand ventilation as per dynamic personnel location and dynamic diesel machinery location and operating status. An optimized zonal ventilation demand is calculated and the optimized mine ventilation system assures optimal air routing and distribution at minimum energy cost.

The optimized mine ventilation system does not require costly air flow sensors which typically have proven problem prone installations due to the harsh mine air environment. Routine maintenance of those sensors is therefore eliminated. Only a few sensors will be required to keep a live correlation check with the model.

OBJECTS OF THE INVENTION

The objectives of this optimized mine ventilation system invention are to assist mine operators with:
  A real-time production enhancement tool which optimizes the underground air distribution to reach ore body sectors which could not be reached with the current ventilation routing procedures;
  A real-time energy management tool that contributes in diminishing the energy required to ventilate underground work zones while maintaining target flow rates;
  A real-time environmental management tool that contributes to diminish the electrical power generation CO emission footprint while also maintaining target flow rates.
  A system that installs easily to existing or new control infrastructure based on "Open Architecture" that connects transparently, without programmatic developmental efforts to any OPC (Ole for Process Control, see www.opcfoundation.org) based control system.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

The aforesaid and other objectives of the present invention are realized by a proper ventilation layout and related equipment parametric information configuration and installation of an optimized mine ventilation system in accordance with this invention along with a basic control system which modulates fans speed and air flow regulator position and which read few critical air flow measurements to correlate in real-time the results of the optimized mine ventilation system modeling and optimizer calculations.

FIG. 2 is a summary block diagram of the optimized mine ventilation system connection to external third party components.

The optimized mine ventilation system [FIG. 2, item (33)], requires the following directly connected third party systems:
  A tracking system providing data on the dynamic location and operating status of the machinery [FIG. 2, item (34)].
  A basic control system (such as PLCs or a DCS to execute local control and to route fan speed setpoints to fans and regulator opening setpoints to air flow regulators [FIG. 2, items (30, 31, 32)].

The optimized mine ventilation system [FIG. 2, item (33)] performs the following general tasks:
  Perform a dynamic air mass flow balance for the entire mine ventilation network inclusive of all fans and air flow regulators or fixed opening bulkheads.
  From the dynamic tracking data, calculate each machinery ventilation demand and personnel ventilation demand.
  Perform a total ventilation demand for all machinery and/or personnel present in each of the mine defined work zones (ore extraction zones, service areas and levels).
  Calculate the aggregate demand for each zone parent-child relationship. For example, the total demand for a level is equal to the total demand for all related ore extraction zones and service areas plus the total demand related to machinery and personnel directly tracked on the level.
  Provide the demand to each of the zone related controllers: auxiliary fans and air flow regulators.
  Fans and airflow regulators can be controlled in manual or semi-automatic mode directly by the operator. A VOD control mode uses tracking data to automatically modulate the fans and air flow regulators as per the dynamic demand calculation.
  When in VOD control mode, the controllers regulates the flow for each zone as per the tracking and safety limits settings.
  In VOD control mode, the surface fans cascade controller will modulate the optimum air flow distribution and the lowest fan operating cost as per the cascade controllers set limits.
  In VOD control mode, the setpoints are filtered for stability, minimum time between up and down changes, ramp-up, ramp-down and deadband before they are sent to the basic control system via OPC connection.
  Critical air flow measurements are monitored and correlated to the modeled flows and when a discrepancy exists, the optimized mine ventilation system calls for a survey and calibration.

The features of the present invention which are believed to be novel are set forth with particularity in the appended claims.

As a first aspect of the invention, there is provided a method of optimizing mine ventilation, the method comprising:
  calculation of a ventilation demand of a zone of interest;
  as a function of machinery location and operating status and personnel location monitoring, determining an optimal quantity of ventilation required for the zone of interest; and
  remotely controlling a ventilation flow in the zone of interest as a function of the determined optimal quantity of ventilation required.

Preferably, the step of determining an optimal quantity of ventilation comprises calculation of monitoring data using a ventilation system model adapted to determine an optimal quantity of ventilation required in the zone of interest.

Preferably, the steps of monitoring the zone of interest, of determining an optimal quantity of ventilation and of remotely controlling the ventilation equipment are carried out in real-time.

Preferably, the step of monitoring comprises monitoring presence of operating machinery and personnel inside the zone of interest and the monitoring data comprises machinery-and-personnel related data.

Preferably, the step of monitoring presence of operating machinery and personnel comprises gathering the machinery-and-personnel related data using a monitoring and communication system covering the zone of interest, where the machinery-and-personnel related data comprises an indication of a quantity of operating machinery and personnel present inside the zone of interest.

Preferably, the machinery-and-personnel related data further comprises, if operating machinery is present in the zone of interest, an indication if the machinery is diesel operated, and if it is the case, an engine or hydraulic-electric operating status of the machinery.

Preferably, the machinery-and-personnel related data further comprises, if operating machinery is present in the zone of interest and the machinery is diesel operated, engine-characteristics related data allowing for determining a total amount of horse power of the machinery.

Preferably, the step of controlling a ventilation flow in the zone of interest is carried out automatically.

Preferably, the presence of machinery is detected using a wireless communication system.

Preferably, the presence of personnel is detected using a wireless communication system.

The presence of machinery can also be detected using a radio frequency identification system.

The presence of personnel can also be detected using a radio frequency identification system.

The step of controlling a ventilation flow in the zone of interest is optionally manually controlled by an operator.

Preferably, the triggering is carried out by the operator using a graphical Human-Machine-Interface allowing graphical visualization of a ventilation status as per simulation model calculations of the zone of interest.

Preferably, the process of remotely controlling a ventilation flow in the zone of interest comprises adjusting speed of fans and/or regulators position.

As a further aspect of the invention, there is provided a system for optimizing ventilation equipment, the system comprising:
  a real-time simulation model based control system which calculates air flow data in real-time for a zone of interest;
  a real-time simulation model that calculates flow and pressure as a function of the density and temperature variation which is a function of depth;
  a real-time simulation model that accounts for natural ventilation pressure flows;
  an optimizer for air flow distribution and fan energy consumption connected to the simulation model unit, as a function of an optimal quantity of ventilation required for the zone of interest;
  a real-time simulation model that will correlate physical air flow measurements to modeled air flow calculations and in case of discrepancies will have the capability to automatically calibrate system components k factor resistance to match physical measurements; and
  a ventilation equipment controlling unit connected to the optimal ventilation simulating unit and adapted to be connected to a communication system for remotely controlling performance of ventilation equipment as a function of the determined optimal quantity of ventilation required.

Preferably, the remote controlling of ventilation equipment is triggered automatically upon reception, by the ventilation equipment controlling unit, of the determined optimal quantity of ventilation required.

The system preferably further comprises a graphical image generating module connected to the monitoring unit for generating, as a function of the calculated by modeling and received monitoring data, a graphical image of a current ventilation status of the zone of interest.

Preferably, the graphical image generating module is further connected to the optimal ventilation simulating unit for generating, as a function of the determined optimal quantity of ventilation required, a graphical image of an optimal ventilation status of the zone of interest.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel optimized mine ventilation system will be described hereinafter. Although the invention is described in terms of specific illustrative embodiment(s), it is to be understood that the embodiment(s) described herein are by way of example only and that the scope of the invention is not intended to be limited thereby.

An embodiment of the optimized mine ventilation system according to the present invention will be described below in detail with reference to the drawings.

Figure 1:
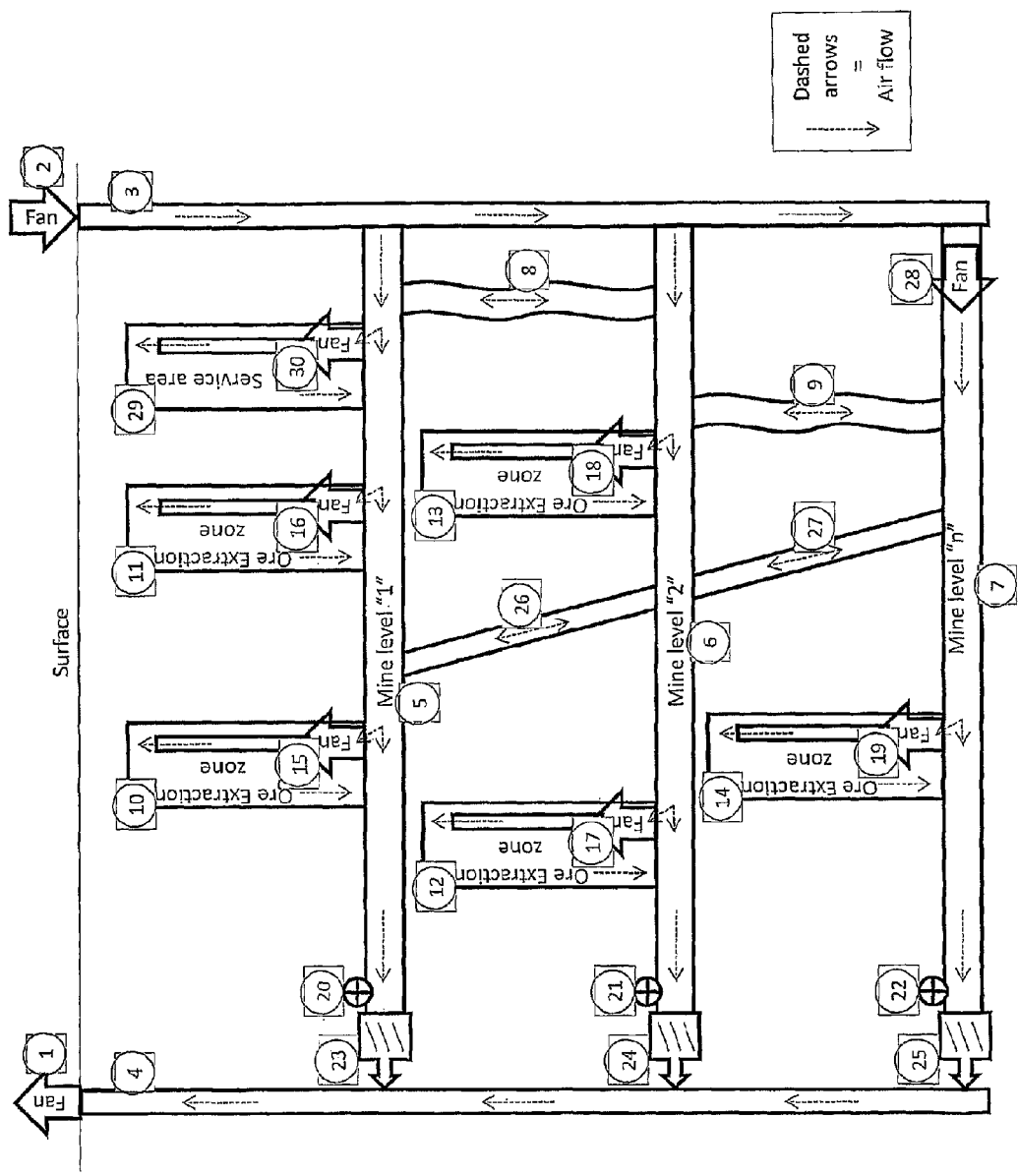
FIG. 1 is background information on a mine ventilation typical layout and related air flow modulation equipment such as fans and airflow regulators within bulkheads. The optimized mine ventilation system invention models the ventilation air flow of the network and controls physical air flow modulation equipment.
Figure 2:
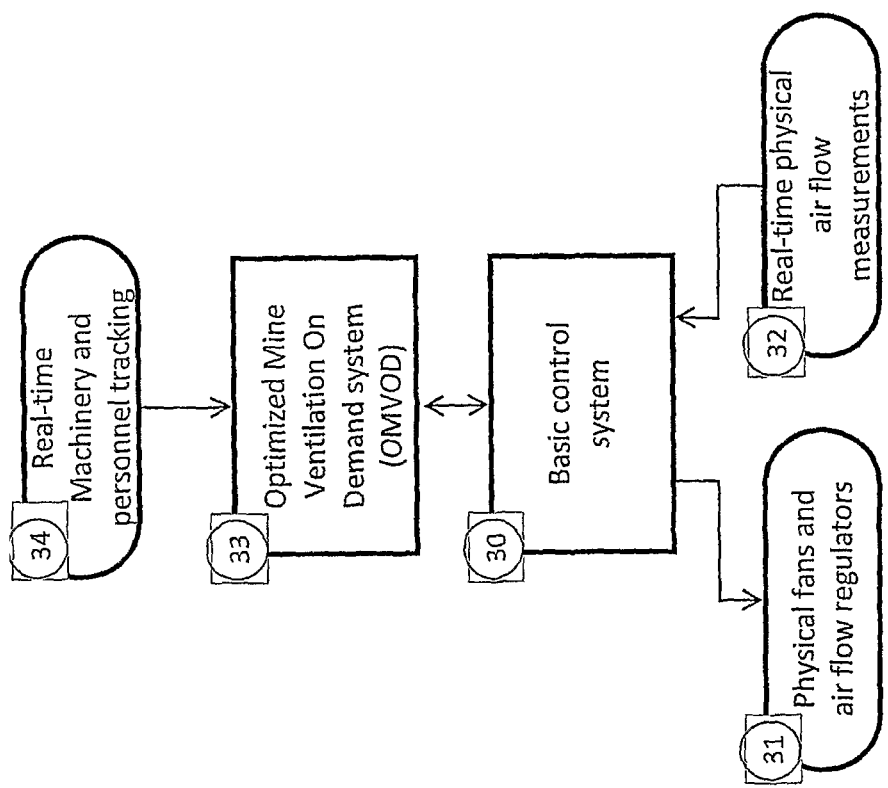
FIG. 2 is a block diagram summary of all ventilation control components inclusive of an optimized mine ventilation system.
Figure 3:
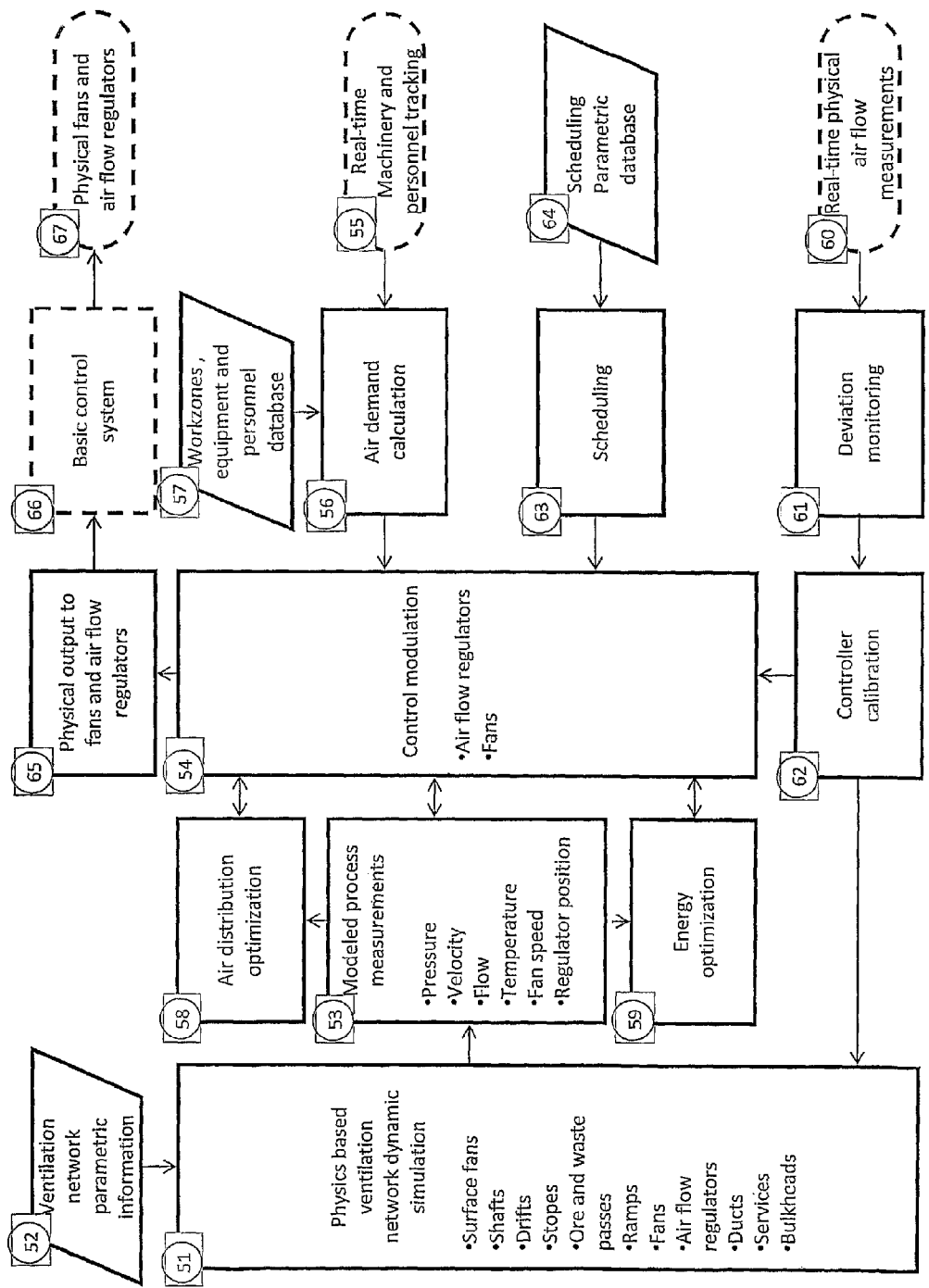
FIG. 3 is a detailed block diagram of the optimized mine ventilation system invention components and links to external elements. Dashed components are external elements to the optimized mine ventilation system.

The following describes a summary of the optimized mine ventilation system functionality and links to external systems with references to FIG. 3.

A third party machinery and personnel tracking system provides real-time data on the machinery location and operating status and on personnel location [FIG. 3, item (55)].

From the dynamic tracking status of each machinery a ventilation demand is calculated for each defined mine work zones as per the following [FIG. 3, items (56, 57)]:
  CFM or m3/s per diesel hp when diesel is "On".
  CFM or m3/s per diesel hp when diesel is "Off". This permits operations to have air available for machinery stopped at a location with personnel around.
  CFM or m3/s per diesel hp when the diesel is "Off" and its hydraulic-electric is "On".

Those three parameters are configurable per machinery by the surface or underground operators.

The system calculates the aggregate demand for each zone parent-child relationship from the zone definition database [FIG. 3, item (57)]. For example, the total demand for a level is equal to the total demand for all related ore extraction zones and service areas plus the total demand related to machinery and personnel directly tracked on the level.

The system sets to a minimum the personnel ventilation demand requirement per zone and overrules the machinery calculation if the personnel demand is higher.

If the calculated personnel and machinery total demand while on VOD control mode, the VOD controller will set the zone flow to a minimum air flow as defined by the ventilation engineer.

The mine ventilation layout, fans and air flow regulators are created in the form of an electronic process and instrumentation diagram using the Simsmart™ Engineering Suite modeling and simulation tool. Parametric information for all layout and control elements present on the diagram is configured in the diagram database [FIG. 3, item (52)]. The diagram is compiled into a run-time engine execution environment [FIG. 3, item (51)]. The run-time engine environment executes in real-time all physics, characteristic, mathematics and logic based equations.

The Simsmart™ Engineering Suite run-time engine is responsible for the following tasks:

- As described above, to calculate the dynamic ventilation air flow demand and summarized per defined mine area such as an ore extraction zone, a level, a service area and other workplaces.
- To model the ventilation network and establish an air flow mass balance. The air density, pressure and temperature are preferably compensated for depth. The real-time model execute real-time calculations for pressure, fluid velocity, flow, temperature, several other fluid properties, fan speed and regulator position [FIG. 3, items (53)].
- To execute controls in manual, semi-automatic and VOD mode to optimize the air distribution and fan energy consumption based on the calculated dynamic air flow demand [FIG. 3, item (54)].
- To provide the required logic for fans and air flow regulators setpoint scheduling [FIG. 3, items (63)].
- To declare and handle alarm and special event conditions.

The following physics calculation assumptions describe the basic concepts and equations used for the simulation model components and the real-time resolution of the differential equations matrix [FIG. 3, item (51)]:

The simulation model uses compressible air flow with a polytropic process. This is a process which occurs with an interchange of both heat and work between the system and its surroundings. The nonadiabatic expansion or compression of a fluid is an example of a polytropic process. The interrelationship between the pressure (P) and volume (V) and pressure and temperature (T) for a gas undergoing a polytropic process are given by Eqs. (1) and (2), $$PV^a = c \quad (1)$$

$$\frac{P^b}{T} = c \quad (2)$$

where a and b are the polytropic constants for the process of interest. These constants, determined from mine surveys. Once these constants are known, Eqs. (1) and (2) can be used with the initial-state conditions ($P_1$ and $T_1$ or $V_1$) and one final-state condition (for example, $T_2$, obtained from physical measurement) to determine the pressure or specific volume of the final state.

Because density varies significantly, the air weight effect is not negligible. In this case there is an auto compression effect. Pressure variation not only causes density variation but also causes temperature variation accordingly based on the polytropic index.

The calculations account for Natural Ventilation Pressure (NVP). NVP is the pressure created in a ventilation network due to the density difference between air at the top and bottom of the downcast and upcast shafts. In deep hot mines there is usually a large difference between surface and underground temperatures—there is a difference in density between air on surface and underground and this causes air to move from high to low density. The NVP will either assist or retard fans in the system. When NVP assists a fan, it tends to move air in the same direction as the fan. The NVP can be the to lower the system resistance curve against which the fan operates. This means the fan will handle more air at lower pressure.

The actual tunnel air resistance is calculated using the entered standardized Atkinson resistance or the standardized Atkinson friction factor.

The air pressure, air velocity, flow resistance and air flow rate are calculated at all points in the system.

The pressure and density calculation accounts for air weight (air potential pressure) and the Bernoulli Equation accounts for potential energy.

Correction of fan specification curves with the density variation effect.

Calculation of variable speed fan flow, pressure, power and efficiency curves.

Ducting junctions, dovetails or transitions can calculate process pressure and flow resistance for each port.

Transitions, junctions and fan calculation accounts for positive and negative flow resistance.

All components calculate air properties: temperature, pressure, viscosity, humidity, dew point temperature, particles, and contaminant concentrations.

An iteration convergence method is used for transient simulation modes.

Latent heat calculation is not available.

The ventilation demand calculation commands controllers to modulate fans and air flow regulators [FIG. 3, item (54)].

There are four types of regulatory controls for fans and air flow regulators in the optimized mine ventilation system:

Auxiliary fans control.

From the air mass flow balance calculations, the auxiliary fans speed is modulated so the output flow at the exit of the ducting section meets the calculated target demand flow for each work zone.

Air flow regulator controls for levels.

From the air mass flow balance calculations, the air flow regulator opening position is modulated so the regulator output flow meets the calculated target demand flow for each work zone.

If an air flow regulator is in manual mode or if the regulator is a fixed bulkhead opening, an intake compensation cascade controller will modulate the surface fans in order to meet the calculated target demand flow.

Surface fans controls.

The surface fan controller is a cascade controller [FIG. 3, items (58, 59)] that optimizes the surface fan speeds in order to minimize energy consumption while assuring all levels to obtain their calculated target demand flow and maintaining a set maximum regulator opening. This maximum regulator opening is the cascade controller setpoint.

It is assumed that all surface fans are driven by a variable frequency drive.

As an example, if the surface fans cascade controller setpoint is set at 80% opening maximum for any air flow regulator, the surface fans will be modulated in order to assure that any level air flow regulator will be at and not exceed this 80% maximum opening.

The surface fans cascade controller calculates a common modulated fan speed for all fans. This speed is then split by a ratio to intake fans and to another ratio to exhausts fans.

Booster fans controls.

The booster fan controller is a cascade controller over the air flow regulator controller. It will modulate the booster fan speed based on set maximum air flow regulator opening. For example if the cascade controller setpoint is set at 70%, this means that when the booster fan will be modulated upward when the regulator position exceeds 70%.

The optimized mine ventilation system has the following control modes [FIG. 3, item (54)]:

Surface Operating Mode:
MAN: A fixed fan speed or regulator position setpoint is entered by the surface operator. The fan speed and/or regulator position not modulated automatically. The simulation model does not modulate the fan speed or the airflow regulator position to meet a CFM value. The machinery tracking has no effect on the control. The local underground controller requires to be in "Surface" mode.

AUT: This mode activates the selected VOD or CFM modes.
  a. VOD: The CFM setpoint is calculated from the dynamic machinery tracking results. The fan speed and/or regulator position is automatically modulated to meet the CFM demand setpoint as per the calculated actual flow by the simulation model. The modulated fan speed or airflow regulator position setpoint is sent to the underground physical device. The controller also needs to be in AUT mode for the VOD mode to be active. The controller also requires to be in "Surface" mode. A minimum flow setting is available for the VOD mode. Therefore, a dynamic tracking ventilation demand setpoint may never be lower than a defined pre-set. The minimum flow presets are defined in a purpose built HMI page.
  b. CFM: The CFM setpoint is a fixed value and is entered by the surface operator for fans or airflow regulator. The fan speed and/or regulator position is automatically modulated to meet the fixed value CFM setpoint as per the calculated actual flow by the simulation model. The simulation model will modulate the fan speed or the airflow regulator position to meet the desired CFM value. The equipment tracking has no effect on the control. The controller also needs to be in AUT mode for the CFM mode to be active. The controller requires to be in "Surface" mode.

Underground Operating Mode:
Control is normally achieved from the surface, but an underground operator via a tablet PC may acquire a control mode called "Underground". When he acquires control he can operate the selected controller in Manual mode.

The surface operator receives an alarm when control is acquired by the underground operator. The surface operator is requested to acknowledge the alarm. When the alarm is acknowledged, the alarm condition disappears.

When the underground operator releases control back to the surface operator, an alarm is displayed to the surface operator. The surface operator is requested to acknowledge the alarm. When the alarm is acknowledged, the alarm condition disappears.

When the control is released by the underground operator, the selected controller goes back to the previous mode in use before he acquired control.

The following describes each mode:
SUR: A fan speed and/or regulator position is set by the surface operator in MAN, AUT (VOD/CFM) modes (see above).
UND: When a controller is set to UND, a fan speed and/or regulator position is manually set by an underground operator via a WIFI tablet PC HMI control page.

The VOD control mode setpoints are filtered [FIG. 3, item (65)] for stability, minimum time between up and down changes, ramp-up, ramp-down and deadband before they are sent to the basic control system and physical fans and air flow regulators via OPC connection [FIG. 3, items (66, 67)].

Since not all mine ventilation operating procedures call for work zone flow setpoints being calculated on machinery location, operating status and personnel location, controller modes and setpoints are also subject to scheduled or ad-hoc events [FIG. 3, item (63)]. Therefore, presets for each controller modes and setpoints can be configured for an array of user definable events [FIG. 3, item (64)]. Optionally, an autoswitch to tracking based ventilation (VOD mode) can be enabled when a minimum ventilation demand has been detected by the dynamic tracking. Likewise, another autoswitch to tracking based ventilation can be enabled when a defined period of time has elapsed.

Scheduling presets can also cover specific events such as pre-blast and post-blast events. The optimized mine ventilation system will warn the operator if pre-blast event is set with remaining personnel and machinery activity in the mine.

The optimized mine ventilation system monitors critical key air flow measurements [FIG. 3, item (60)] and will alarm when a correlation deviation to the measurements calculated by the model [FIG. 3, item (61)]. The optimized mine ventilation system will call for a flow survey to verify if the measurement instrument or the calculated flow are in error. If it is concluded that the calculated flow must be calibrated, the ventilation engineer will set the related flow controller in calibration mode. Then, it will automatically adjust the related system portion calculated k factor to match the survey data.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art. Indeed, the system of the invention can be used in any confined environment where there is a need for ventilation as a function of the presence of humans, animals and/or equipment, for example: tunnels.

The invention claimed is:
1. A method for minimizing energy consumption of fans in an underground mine, the underground mine having a ventilation layout configuration and a plurality of zones of interest, the underground mine comprising a plurality of surface fans, a plurality of booster fans, a plurality of airflow regulators, and a plurality of airflow measurement stations located in at least some of the plurality of zones of interest, the method comprising:
  a) monitoring machinery presence, machinery operating status, and personnel presence in each of the zones of interest;

b) as a function of the machinery presence, of the machinery operating status, and of the personnel presence in each of the zones of interest, dynamically calculating a required dynamic ventilation airflow demand for each of the zones of interest;

c) as a function of the calculated required ventilation demands, dynamically calculating a lowest possible surface fan speed for each of the surface fans, a lowest possible booster fan speed for each of the booster fans, and a largest possible opening position for each of the airflow regulators such that each of the zones of interest receives the calculated required ventilation demand and such that none of the fan speeds exceeds a predetermined maximum fan operating speed and none of the airflow regulator opening positions exceeds a predetermined maximum opening position;

d) adjusting, if necessary, each of the surface fans to its calculated lowest possible surface fan speed, and/or each of the booster fans to its calculated lowest possible booster fan speed, and/or each of the airflow regulators to its calculated largest possible opening position;

e) repeating steps c) and d) until a current ventilation in each of the zones of interest, determined by calculating an air mass flow balance using a dynamics simulation model and as validated by the airflow measurement stations, is at least equal to the calculated required ventilation demand for each of the zones of interest;

whereby the energy consumption of the fans is minimized.

2. A method as claimed in claim 1, wherein the required ventilation demand for each of the zones of interest is calculated by a human operator.

3. A method as claimed in claim 1, wherein the required ventilation demand for each of the zones of interest is calculated by a software.

4. A method as claimed in claim 1, wherein the predetermined maximum opening position is smaller than 100%.

5. A method as claimed in claim 4, wherein the predetermined maximum opening position is smaller than or equal to 80%.

6. A method as claimed in claim 1, wherein the underground mine comprises at least one airflow measurement station for each of the airflow regulators.

7. A method as claimed in claim 1, wherein the current ventilation in each of the zones of interest is determined by calculating the air mass flow balance using the dynamic simulation model, the dynamic simulation model taking into consideration air density, air temperature and air resistance changes as a function of depth and taking into consideration natural ventilation phenomena.

8. A method as claimed in claim 7, wherein the air mass flow balance is calculated as a function of the underground mine ventilation layout configuration, of a current surface fan speed of each of the surface fans, of a current booster fan speed of each of the booster fans, and of a current opening position of each of the airflow regulators.

9. A method for minimizing energy consumption of fans in an underground mine, the underground mine having a ventilation layout configuration and a plurality of zones of interest, the underground mine comprising a plurality of surface fans, a plurality of booster fans, a plurality of airflow regulators, and a plurality of airflow measurement stations located in at least some of the zones of interest, the method comprising:

a) monitoring machinery presence, machinery operating status, and personnel presence in each of the zones of interest;

b) as a function of the machinery presence, of the machinery operating status, and of the personnel presence in each of the zones of interest, dynamically calculating a required ventilation demand for each of the zones of interest;

c) as a function of the calculated required ventilation demands, determining, for each of the surfaces fans, the lowest possible surface fan speed, for each of the booster fans, the lowest possible booster fan speed, and for each of the airflow regulators, the largest possible opening position, such that each of the zones of interest receives the calculated required ventilation demand, and such that none of the fan speeds exceeds a predetermined maximum operating speed and none of the airflow regulator opening positions exceeds a predetermined maximum opening position;

d) adjusting, if necessary, each of the surface fans to its determined lowest possible surface fan speed, and/or each of the booster fans to its determined lowest possible booster fan speed, and/or each of the airflow regulators to its determined largest possible opening position;

e) repeating steps c) and d) until a current ventilation in each of the zones of interest, determined by calculating an air mass flow balance using a dynamics simulation model and as validated by the airflow measurement stations, is at least equal to the calculated required ventilation demand for each of the zones of interest; and f) repeating steps a) to e) continuously;

whereby the energy consumption of the fans is minimized.

10. A method as claimed in claim 9, wherein the predetermined maximum opening position is smaller than 100%.

11. A method as claimed in claim 9, wherein the predetermined maximum opening position is smaller than or equal to 80%.

12. A method as claimed in claim 9, wherein the underground mine comprises at least one airflow measurement station for each of the airflow regulators.

13. A method as claimed in claim 9, wherein the monitoring step comprises monitoring dynamic machinery presence, dynamic machinery operating status, and dynamic personnel presence in each of the zones of interest, and wherein the required ventilation demand for each of the zones of interest is calculated as a function of the dynamic machinery presence, the dynamic machinery operating status, and the dynamic personnel presence in each of the zones of interest.

14. A method as claimed in claim 9, wherein the dynamic simulation model takes into consideration air density, air temperature and air resistance changes as a function of depth and takes into consideration natural ventilation phenomena.

15. A method as claimed in claim 14, wherein the air mass flow balance is calculated as a function of the underground mine ventilation layout configuration, of a current surface fan speed of each of the surface fans, of a current booster fan speed of each of the booster fans, and of a current opening position of each of the airflow regulators.

16. A method for minimizing energy consumption of fans in an underground mine, the underground mine having a ventilation layout configuration and a plurality of zones of interest, the underground mine comprising a plurality of surface fans, a plurality of booster fans, a plurality of airflow regulators, and a plurality of airflow measurement stations located in at least some of the zones of interest, the method comprising:

a) monitoring machinery presence, machinery operating status, and personnel presence in each of the zones of interest;
b) as a function of the machinery presence, of the machinery operating status, and of the personnel presence in each of the zones of interest, determining a required ventilation demand for each of the zones of interest;
c) as a function of the underground mine ventilation layout configuration, of a current surface fan speed of each of the surface fans, of a current booster fan speed of each of the booster fans, and of a current opening position of each of the airflow regulators, dynamically calculating an air mass flow balance using a dynamic simulation model, the dynamic simulation model taking into consideration air density, air temperature and air resistance changes as a function of depth and taking into consideration natural ventilation phenomena;
d) as a function of the calculated air mass flow balance, dynamically calculating a current ventilation in each of the zones of interest;
e) as a function of the determined required ventilation demands, determining, for each of the surface fans, the lowest possible surface fan speed, for each of the booster fans, the lowest possible booster fan speed, and for each of the airflow regulators, the largest possible opening position, such that each of the zones of interest receives the determined required ventilation demand, and such that none of the fan speeds exceeds a predetermined maximum fan operating speed and none of the airflow regulator opening positions exceeds a predetermined maximum opening position;
f) adjusting, if necessary, each of the surface fans to its determined lowest possible surface fan speed, and/or each of the booster fans to its determined lowest possible booster fan speed, and/or each of the airflow regulators to its determined largest possible opening position;
g) repeating steps c), d), e) and f) until the current calculated ventilation in each of the zones of interest is at least equal to the determined required ventilation demand in each of the zones of interest; and
h) repeating steps a) to g) continuously;
whereby the energy consumption of the fans is minimized.

17. A method as claimed in claim 16, wherein the required ventilation demand for each of the zones of interest is determined by a human operator.

18. A method as claimed in claim 16, wherein the required ventilation demand for each of the zones of interest is determined by a software.

19. A method as claimed in claim 16, wherein the predetermined maximum opening position is smaller than 100%.

20. A method as claimed in claim 19, wherein the predetermined maximum opening position is smaller than or equal to 80%.

21. A method as claimed in claim 16, wherein the underground mine comprises at least one airflow measurement station for each of the airflow regulators.

22. A method for minimizing energy consumption of fans in an underground mine, the underground mine having a ventilation layout configuration and a plurality of zones of interest, the underground mine comprising a plurality of surface fans, a plurality of booster fans, a plurality of airflow regulators, and a plurality of airflow measurement stations located in at least some of the zones of interest, the method comprising:

a) monitoring machinery presence, machinery operating status, and personnel presence in each of the zones of interest;
b) as a function of the machinery presence, of the machinery operating status, and of the personnel presence in each of the zones of interest, dynamically calculating a required ventilation demand for each of the zones of interest;
c) as a function of the underground mine ventilation layout configuration, of a current surface fan speed of each of the surface fans, of a current booster fan speed of each of the booster fans, and of a current opening position of each of the airflow regulators, dynamically calculating an air mass flow balance using a dynamic simulation model, the dynamic simulation model taking into consideration air density, air temperature and air resistance changes as a function of depth and taking into consideration natural ventilation phenomena;
d) as a function of the calculated air mass flow balance, calculating a current ventilation in each of the zones of interest;
e) as a function of the calculated required ventilation demands, determining, for each of the surface fans, the lowest possible surface fan speed, for each of the booster fans, the lowest possible booster fan speed, and for each of the airflow regulators, the largest possible opening position, such that each of the zones of interest receives the calculated required ventilation demand, and such that none of the fan speeds exceeds a predetermined maximum fan operating speed and none of the airflow regulator opening positions exceeds a predetermined maximum opening position;
f) adjusting, if necessary, each of the surface fans to its determined lowest possible surface fan speed, and/or each of the booster fans to its determined lowest possible booster fan speed, and/or each of the airflow regulators to its determined largest possible opening position;
g) repeating steps c), d), e) and f) until the current calculated ventilation in each of the zones of interest at least equal to the calculated required ventilation demand in each of the zones of interest; and
h) repeating steps a) to g) continuously;
whereby the energy consumption of the fans is minimized.

23. A method as claimed in claim 22, wherein the predetermined maximum opening position is smaller than 100%.

24. A method as claimed in claim 23, wherein the predetermined maximum opening position is smaller than or equal to 80%.

25. A method as claimed in claim 22, wherein the underground mine comprises at least one airflow measurement station for each of the airflow regulators.

26. A method as claimed in claim 22, wherein the monitoring step comprises monitoring dynamic machinery presence, dynamic machinery operating status, and dynamic personnel presence in each of the zones of interest, and wherein the required ventilation demand for each of the zones of interest is calculated as a function of the dynamic machinery presence, the dynamic machinery operating status, and the dynamic personnel presence in each of the zones of interest.

27. A system for minimizing energy consumption of fans in an underground mine including a program for causing an execution environment to execute, the underground mine having a ventilation layout configuration and a plurality of zones of interest, the underground mine comprising a plurality of surface fans, a plurality of booster fans, a plurality of airflow regulators, and a plurality of airflow measurement stations located in at least some of the zones of interest, the system comprising:
- a) a controlling unit in communication with the surface fans, with the booster fans, and with the airflow regulators, the controlling unit being configured to set a surface fan speed to each of the surface fans, to set a booster fan speed to each of the booster fans, and to set an opening position to each of the airflow regulators, wherein the controlling unit comprises a computer readable medium containing program instructions for controlling said control unit;
- b) a monitoring unit in communication with the airflow measurement stations to receive airflow measurements therefrom;
- c) a tracking unit for receiving machinery presence data, machinery operating status data, and personnel presence data for each of the zones of interest, wherein the tracking unit comprises a computer readable medium containing program instructions for controlling said tracking unit;
- d) a calculating unit in communication with the tracking unit, the calculating unit being configured to dynamically calculate a required ventilation demand for each of the zones of interest as a function of the machinery presence data, of the machinery operating status data, and of the personnel presence data for each of the zones of interest, wherein the calculating unit comprises a computer readable medium containing program instructions for controlling said calculating unit; and
- e) an optimizing unit in communication with the controlling unit, with the calculating unit, and with the monitoring unit, the optimizing unit being configured to determine, as a function of the calculated required ventilation demand for each of the zones of interest and as a function of the airflow measurements, a lowest possible surface fan speed for each of the surface fans, a lowest possible booster fan speed for each of the booster fans, and a largest possible opening position for each of the airflow regulators such that each of the zones of interest receives at least the calculated required ventilation demand and such that none of the fan speeds exceeds a predetermined maximum fan operating speed and none of the airflow regulator opening positions exceeds a predetermined maximum opening position, wherein the optimizing unit comprises a computer readable medium containing program instructions for controlling said optimizing unit.

28. A system as claimed in claim 27, wherein the tracking unit is configured for receiving dynamic machinery presence data, dynamic machinery operating status data, and dynamic personnel presence data for each of the zones of interest, and wherein the calculating unit is configured to calculate the required ventilation demand for each of the zones of interest as a function of the dynamic machinery presence data, of the dynamic machinery operating status data, and of the dynamic personnel presence data for each of the zones of interest.

29. A system as claimed in claim 27, wherein the predetermined maximum opening position is smaller than 100%.

30. A system as claimed in claim 29, wherein the predetermined maximum opening position is smaller than or equal to 80%.

31. A system as claimed in claim 27, wherein the underground mine comprises at least one airflow measurement station for each of the airflow regulators.

32. A system for minimizing energy consumption of fans in an underground mine including a program for causing an execution environment to execute, the underground mine having a ventilation layout configuration and a plurality of zones of interest, the underground mine comprising a plurality of surface fans, a plurality of booster fans, a plurality of airflow regulators, and a plurality of airflow measurement stations located in at least some of the zones of interest, the system comprising:
- a) a controlling unit in communication with the surface fans, with the booster fans, and with the airflow regulators, the controlling unit being configured to set a surface fan speed to each of the surface fans, to set a booster fan speed to each of the booster fans, and to set an opening position to each of the airflow regulators, wherein the controlling unit comprises a computer readable medium containing program instructions for controlling said controlling unit;
- b) a monitoring unit in communication with the airflow measurement stations for receiving airflow measurements therefrom;
- c) a tracking unit for receiving dynamic machinery presence data, dynamic machinery operating status data, and dynamic personnel presence data for each of the zones of interest, wherein the tracking unit comprises a computer readable medium containing program instructions for controlling said tracking unit;
- d) a calculating unit in communication with the tracking unit, the calculating unit dynamically calculating a required ventilation demand for each of the zones of interest as a function of the dynamic machinery presence data, of the dynamic machinery operating status data, and of the dynamic personnel presence data for each of the zones of interest, wherein the calculating unit comprises a computer readable medium containing program instructions for controlling said calculating unit; and
- e) an optimizing unit operatively connected to the controlling unit, to the calculating unit and to the monitoring unit, the optimizing unit being configured to determine, as a function of the calculated required ventilation demand for each of the zones of interest and as a function of the airflow measurements, a lowest possible surface fan speed for each of the surface fans, a lowest possible booster fan speed for each of the booster fans, and a largest possible opening position for each of the airflow regulators such that each of the zones of interest receives at least the calculated required ventilation demand and such that none of the fan speeds exceeds a predetermined maximum fan operating speed and none of the airflow regulator opening positions exceeds a predetermined maximum opening position, wherein the optimizing unit comprises a computer readable medium containing program instructions for controlling said optimizing unit.

33. A system as claimed in claim 32, wherein the predetermined maximum opening position is smaller than 100%.

34. A system as claimed in claim 33, wherein the predetermined maximum opening position is smaller than or equal to 80%.

35. A system as claimed in claim 32, wherein the underground mine comprises at least one airflow measurement station for each of the airflow regulators.

36. A system for minimizing energy consumption of fans in an underground mine, the underground mine having a ventilation layout configuration and a plurality of zones of interest, the underground mine comprising a plurality of surface fans, a plurality of booster fans, a plurality of airflow regulators, and a plurality of airflow measurement stations located in at least some of the zones of interest, the system comprising:

a) a controlling unit in communication with the surface fans, with the booster fans, and with the airflow regulators, the controlling unit being configured to set a surface fan speed to each of the surface fans, to set a booster fan speed to each of the booster fans, and to set an opening position to each of the airflow regulators, wherein the controlling unit comprises a computer readable medium containing program instructions for controlling said controlling unit;

b) a simulating unit continuously calculating, as a function of the ventilation layout configuration, as a function of a current surface fan speed for each of the surface fans, as a function of a current booster fan speed for each of the booster fans, and as a function of a current airflow regulator opening position for each of the airflow regulators, an air mass flow balance using a dynamic simulation model, the dynamic simulation model taking into consideration air density, air temperature and air resistance changes as a function of depth and taking into consideration natural ventilation phenomena, the simulation unit also calculating, as a function of the calculated air mass flow balance, a current calculated ventilation for each of the zones of interest;

c) a tracking unit for receiving machinery presence data, machinery operating status data, and personnel presence data for each of the zones of interest, wherein the tracking unit comprises a computer readable medium containing program instructions for controlling said tracking unit;

d) a calculating unit in communication with the tracking unit, the calculating unit being configured to calculate a required ventilation demand for each of the zones of interest as a function of the machinery presence data, of the machinery operating status data, and of the personnel presence data for each of the zones of interest, wherein the calculating unit comprises a computer readable medium containing program instructions for controlling said calculating unit; and e) an optimizing unit in communication with the controlling unit, with the calculating unit, and with the simulating unit, the optimizing unit being configured to determine, as a function of a calculated required ventilation demand for each of the zones of interest and as a function of the current calculated ventilation in each of the zones of interest, a lowest possible surface fan speed for each of the surface fans, a lowest possible booster fan speed for each of the booster fans, and a largest possible opening position for each of the airflow regulators such that each of the zones of interest receives at least the calculated required ventilation demand and such that none of the fan speeds exceeds a predetermined maximum fan operating speed and none of the airflow regulator opening positions exceeds a predetermined maximum opening position, wherein the optimizing unit comprises a computer readable medium containing program instructions for controlling said optimizing unit.

37. A system as claimed in claim 36, wherein the tracking unit is configured for receiving dynamic machinery presence data, dynamic machinery operating status data, and dynamic personnel presence data for each of the zones of interest, and wherein the calculating unit is configured to calculate the required ventilation demand for each of the zones of interest as a function of the dynamic machinery presence data, of the dynamic machinery operating status data, and of the dynamic personnel presence data for each of the zones of interest.

38. A system as claimed in claim 36, wherein the predetermined maximum opening position is smaller than 100%.

39. A system as claimed in claim 36, wherein the predetermined maximum opening position is smaller than or equal to 80%.

40. A system as claimed in claim 36, wherein the underground mine comprises at least one airflow measurement station for each of the airflow regulators.

41. A system for minimizing energy consumption of fans in an underground mine, the underground mine having a ventilation layout configuration and a plurality of zones of interest, the underground mine comprising a plurality of surface fans, a plurality of booster fans, a plurality of airflow regulators, and a plurality of airflow measurement stations located in at least some of the zones of interest, the system comprising:

a) a controlling unit in communication with the surface fans, with the booster fans, and with the airflow regulators, the controlling unit being configured to set a surface fan speed to each of the surface fans, to set a booster fan speed to each of the booster fans, and to set an opening position to each of the airflow regulators, wherein the controlling unit comprises a computer readable medium containing program instructions for controlling said controlling unit;

b) a simulating unit continuously calculating, as a function of the ventilation layout configuration, as a function of a current surface fan speed for each of the surface fans, as a function of a current booster fan speed for each of the booster fans, and as a function of a current airflow regulator opening position for each of the airflow regulators, an air mass flow balance using a dynamic simulation model, the dynamic simulation model taking into consideration air density, air temperature and air resistance changes as a function of depth and taking into consideration natural ventilation phenomena, the simulation unit also calculating, as a function of the calculated air mass flow balance, a current calculated ventilation for each of the zones of interest;

c) a tracking unit for receiving dynamic machinery presence data, dynamic machinery operating status data, and dynamic personnel presence data for each of the zones of interest, wherein the tracking unit comprises a computer readable medium containing program instructions for controlling said tracking unit;

d) a calculating unit in communication with the tracking unit, the calculating unit dynamically calculating a required ventilation demand for each of the zones of interest as a function of the dynamic machinery presence data, of the dynamic machinery operating status data, and of the dynamic personnel presence data for each of the zones of interest, wherein the calculating unit comprises a computer readable medium containing program instructions for controlling said calculating unit; and e) an optimizing unit in communication with the controlling unit, with the simulating unit, and with the calculating unit, the optimizing unit being configured to determine, as a function of the calculated required ventilation demand for each of the zones of interest and as a function of the current calculated ventilation in each of the zones of interest, a lowest possible surface fan speed for each of the surface fans, a lowest possible booster fan speed for each of the booster fans, and a largest possible opening position for each of the airflow regulators such that each of the zones of interest receives at least the calculated required ventilation demand and such that none of the fan speeds exceeds a predetermined maximum fan operating speed and none of the airflow regulator opening positions exceeds a predetermined maximum opening position, wherein the optimizing unit comprises a computer readable medium containing program instructions for controlling said optimizing unit.

42. A system as claimed in claim 41, wherein the predetermined maximum opening position is smaller than 100%.

43. A system as claimed in claim 41, wherein the predetermined maximum opening position is smaller than or equal to 80%.

44. A system as claimed in claim 41, wherein the underground mine comprises at least one airflow measurement station for each of the airflow regulators.

\* \* \* \* \*